(12) United States Patent
Harrison et al.

(10) Patent No.: US 9,458,304 B2
(45) Date of Patent: Oct. 4, 2016

(54) VULCANIZED RUBBER CONVERSION

(71) Applicants: Brian Harrison, Kanata (CA); Hurdon Hooper, Fredericton (CA)

(72) Inventors: Brian Harrison, Kanata (CA); Hurdon Hooper, Fredericton (CA)

(*) Notice: Subject to any disclaimer, the term of this patent is extended or adjusted under 35 U.S.C. 154(b) by 0 days.

(21) Appl. No.: 14/090,723

(22) Filed: Nov. 26, 2013

(65) Prior Publication Data

US 2014/0148522 A1     May 29, 2014

Related U.S. Application Data

(60) Provisional application No. 61/730,226, filed on Nov. 27, 2012.

(51) Int. Cl.
    *C08J 11/04*     (2006.01)
    *C08J 11/24*     (2006.01)
    *C08J 11/14*     (2006.01)

(52) U.S. Cl.
    CPC ............ *C08J 11/24* (2013.01); *C08J 11/14* (2013.01); *C08J 2319/00* (2013.01); *Y02W 30/704* (2015.05); *Y02W 30/706* (2015.05)

(58) Field of Classification Search
    CPC ...... C08J 11/14; C08J 11/24; C08J 2319/00; B29D 30/06901
    USPC .................................. 521/40–49.8
    See application file for complete search history.

(56) References Cited

U.S. PATENT DOCUMENTS

| | | |
|---|---|---|
| 6,387,965 B1 | 5/2002 | Benko et al. |
| 6,548,560 B1 | 4/2003 | Kovalak et al. |
| 6,573,315 B1 | 6/2003 | Colvin et al. |
| 6,737,452 B2 | 5/2004 | Colvin et al. |
| 6,743,839 B2 | 6/2004 | Colvin et al. |
| 7,166,658 B2 | 1/2007 | Harrison et al. |
| 8,415,402 B2 | 4/2013 | Harrison et al. |
| 2003/0187105 A1 | 10/2003 | Colvin et al. |
| 2003/0203997 A1 | 10/2003 | Colvin et al. |
| 2008/0139678 A1* | 6/2008 | Fan et al. ............ 521/43 |
| 2010/0113705 A1* | 5/2010 | Harrison et al. ...... 525/333.1 |

* cited by examiner

*Primary Examiner* — Frances Tischler
(74) *Attorney, Agent, or Firm* — Pearne & Gordon LLP (57) ABSTRACT

Vulcanized rubber, for example from used tires, can be devulcanized to provide a reaction product that has similar rheological properties to the original un-vulcanized rubber. The vulcanized rubber is processed at a temperature that is less than a critical temperature of a solvent, such as water or water and alcohol. The process is carried out at a pressure that is higher than the vapor pressure of the solvent.

24 Claims, 4 Drawing Sheets

VULCANIZED RUBBER CONVERSION

TECHNICAL FIELD

The present disclosure relates to treating rubber and in particular to the conversion of vulcanized rubber material, such as used tires or other scrap materials, to produce a product that is suitable for use as a component in the production of other rubber materials.

BACKGROUND

Converting vulcanized rubber, as commonly used in tires, to devulcanized rubber is a desirable process as it allows the converted rubber to be reused in the production of rubber products.

Various processes are known for devulcanizing rubber. For example, vulcanized rubber can be treated by heating the rubber in a solvent, which is typically water. The conversion treatment is carried out at an elevated temperature and a pressure that is approximately equal to the saturated vapour pressure of the solvent. This process may produce a reaction product that can be easily separated into polymer and carbon black. While the process is useful, the polymers produced from the high temperature processing have a molecular weight between 40,000 and 100,000 which is less than the molecular weight of 200,000-300,000 of the original polymer. As such, the polymer produced from the devulcanization process differs substantially from the original polymer and so is limited in its use as a replacement of original polymer when producing vulcanized rubber.

An additional, alternative and/or improved process for converting vulcanized rubber into polymer is desirable.

DETAILED DESCRIPTION

In accordance with the present disclosure there is provided a method of converting vulcanized rubber comprising heating vulcanized rubber in a reactor in the presence of a solvent to a temperature below a critical temperature of the solvent; providing a pressure in the reactor that is substantially higher than a saturated vapor pressure of the solvent at the temperature; and maintaining the temperature and the pressure for a time sufficient to convert the vulcanized rubber to a product that has rheological properties similar to un-vulcanized rubber.

In accordance with the present disclosure there is provided a further method comprising A method of converting vulcanized rubber comprising: heating in a reactor the vulcanized rubber and a solvent to a reaction temperature below a critical temperature of the solvent; providing a reaction pressure in the reactor that is higher than a saturated vapour pressure of the solvent at the reaction temperature; and maintaining the reaction temperature and the reaction pressure for a reaction time sufficient to break at least a portion of crosslinks of the vulcanized rubber.

In a further embodiment, bulk devulcanization of the vulcanized rubber occurs when the reaction temperature and reaction pressure are maintained for the reaction time.

In a further embodiment, maintaining the reaction temperature and the reaction pressure for the reaction time reduces an amount of depolymerisation that occurs.

In a further embodiment, the vulcanized rubber is substantially devulcanized.

In a further embodiment, the vulcanized rubber is more than 90% devulcanized after maintaining the reaction temperature and reaction pressure for the reaction time.

In a further embodiment, substantially no depolymerisation occurs.

In a further embodiment, a product produced by maintaining the reaction temperature and reaction pressure for the reaction time comprises a rubber hydrocarbon having a molecular weight that is similar to a molecular weight of a rubber hydrocarbon of the vulcanized rubber prior to vulcanization.

In a further embodiment, rheological properties of a product produced by maintaining the reaction temperature and reaction pressure for the reaction time are similar to rheological properties of the vulcanized rubber prior to vulcanization.

In a further embodiment, the rheological properties are measured on a rheometer and comprise an elastic component of viscosity (G') and a viscous component of viscosity (G").

In a further embodiment, the solvent is a mixture of water and an organic solvent.

In a further embodiment, the organic solvent, comprises alcohol.

In a further embodiment, the organic solvent consists of alcohol.

In a further embodiment, the solvent comprises water.

In a further embodiment, the reaction temperature is between about 150° C. and about 300° C.

In a further embodiment, the reaction temperature is between about 200° C. and about 285° C.

In a further embodiment, the reaction pressure is between 5 psi and 4500 psi higher than the saturated pressure of the solvent.

In a further embodiment, the reaction pressure is between 100 psi and 1500 psi higher than the saturated vapour pressure of the solvent.

In a further embodiment, the reaction pressure is provided in part by an inert gas.

In a further embodiment, the pressure is provided in part hydraulically.

In a further embodiment, the vulcanized rubber is from used tires.

In a further embodiment, the used tire is shredded to produce pieces of vulcanized rubber having a particle size between about 0.1 mm and about 5 mm.

In a further embodiment, the method further comprises shredding the used tires,

In a further embodiment, the method further comprises mixing a product produced by maintaining the reaction temperature and reaction pressure for the reaction time with virgin polymer; and vulcanizing the mixture of the product and virgin polymer.

In a further embodiment, the method further comprises purging air from the reactor prior to heating.

In a further embodiment, the method further comprises washing and drying a product produced by maintaining the reaction temperature and reaction pressure for the reaction time.

In a further embodiment, the vulcanized rubber comprises: ethylene propylene diene monomer (EPDM); styrene-butadiene rubber (SBR); natural rubber; butyl rubber; nitrile rubber; cholinated butyl rubber; or chloroprene.

Rubber products are typically made by vulcanizing rubber polymer, and other additives such as carbon black, to create a product with the desired physical characteristics. The vulcanized rubber products may be recycled after they have been used. One possible technique for recycling vulcanized rubber products is to devulcanize the rubber to produce a reaction product that can be used again in the vulcanization process. The reaction product of the devulcanization product can be mixed with virgin rubber polymer, that is polymer that has not been vulcanized. When mixing the devulcanized rubber with virgin polymer it would be desirable for the devulcanized rubber be similar to the virgin polymer. The more similar the devulcanized rubber is to the virgin rubber polymer, the greater an amount of devulcanized rubber can be mixed with the virgin rubber while still producing vulcanized rubber product with the desired characteristics.

Devulcanization may be considered as a reaction that contains two primary mechanisms or processes. In the first process the crosslinks formed by sulphur bridges between polymer molecules during vulcanization are broken. This may be referred to as crosslink scission. In the second process the polymer molecules themselves may be broken. This may be referred to as chain scission or depolymerization. Although described as two separate processes, they have previously been difficult to separate. Accordingly, it has been difficult to devulcanize rubber without depolymerization occurring. In order to produce polymer that is close to the original polymer prior to vulcanization, it is desirable to devulcanize the rubber without depolymerizing the polymer, or at least reducing an amount of depolymerization that occurs. That is, it desirable to break the crosslinks without the occurrence of chain scission.

In certain applications, it is desirable to devulcanize rubber and then separate the polymer from carbon black that was added during the production of a rubber product. U.S. Pat. No. 7,166,658 entitled "Rubber Reduction", which is incorporated in its entirety herein by reference, describes a rubber reduction process. U.S. Pat. No. 8,415,402 entitled "Separating Devulcanized Rubber", which is incorporated in its entirety herein by reference, describes a process for separating polymer from carbon black. To separate the devulcanized rubber into polymer and carbon black the devulcanized material must be nearly 100% devulcanized. The devulcanization may be achieved by subjecting the vulcanized rubber to a high temperature and pressure. The temperature may be at or above a critical temperature of a solvent and the pressure may be approximately the saturated vapour pressure at the critical temperature. Completely devulcanized material will be able to completely dissolve in cyclohexane or toluene when stirred and/or heated to facilitate the dissolution process. Once the polymer is dissolved, the carbon black can be separated. Separating the carbon black from the dissolved polymer and solvent solution may be difficult. The separation may be facilitated by extracting the polymer from the devulcanized rubber using a solvent without agitating the solvent. If the vulcanized rubber is not 100% devulcanized, a considerable amount of polymer will be left in the carbon black residue and good separation will not be achieved. To accomplish 100% devulcanization, temperatures in excess of 290° C. have been used. However, with these high temperatures both crosslink scission and chain scission occur, resulting in a polymer of reduced molecular weight when compared to the virgin polymer.

When the process described in U.S. Pat. No. 7,166,658 is carried out at between 260 and 280° C. only limited surface devulcanization occurs with hydrocarbon and carbon black only being removed from the surface of the rubber particles and the amount of polymer dissolving in toluene or cyclohexane was <0.1%.

In order to separate the polymer from carbon black of a vulcanized rubber product, the rubber is devulcanized at a temperature above 290° C. However, at such elevated temperatures, chain scission begins to occur, resulting in different polymers from the original polymers.

As described further below, it is possible to achieve substantial devulcanization of rubber, while reducing or limiting an amount of chain scission. The resultant products of the process may be mixed with new rubber, or virgin polymer, to produce new vulcanized rubber products. Since chain scission is limited, the resultant polymer from the processing of vulcanized rubber may be similar to the original rubber polymers used to produce the product. Accordingly, it may be possible to mix a greater amount of resultant polymer with new rubber polymer, without adversely affecting the characteristics of the resultant product.

As described further herein, vulcanized rubber may be substantially devulcanized at temperatures below 280° C. and a pressure substantially higher than the saturated vapour pressure at the reaction temperature. Carrying out the devulcanization process at the reduced temperature and elevated pressure results in substantial devulcanization, with limited chain scission. Further, the low temperature and high pressure reaction results in the bulk devulcanization of rubber instead of simply surface devulcanization as is the case for high temperature reactions.

Figure 1:
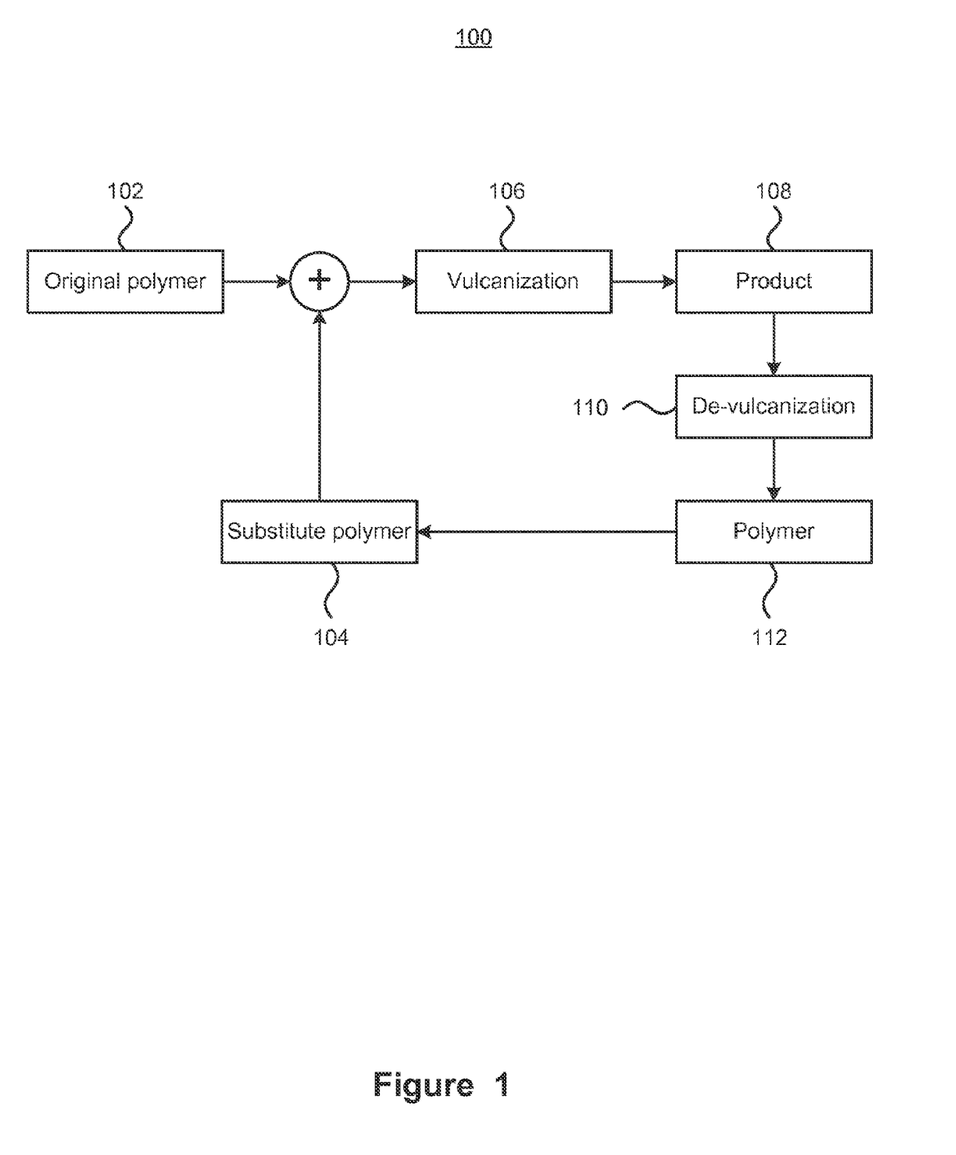
FIG. 1 is a block diagram of a process for producing vulcanized rubber.

FIG. 1 is a block diagram of a process for producing vulcanized rubber. The process 100 mixes original, or virgin, polymer 102 with some amount of substitute polymer 104. The amount of substitute polymer 104 used generally depends on how closely the properties of the substitute polymer 104 match the properties of the original polymer 102. The closer the substitute polymer is to the original polymer, the greater the ratio of substitute to original polymer can be. The substitute polymer 104 is typically less expensive than the original polymer 102 and as such it may be desirable to use as much substitute polymer as possible, while still producing a product with acceptable physical characteristics. The mixture of original polymer and substitute polymer undergoes a vulcanization process 106 which produces a desired product 108. A common example of a product is tires for vehicles. Once the product 108 has reached an end of its useful life it may be recycled. The recycling process may include a devulcanization process 110 which converts the vulcanized rubber into a polymer 112. Depending upon the devulcanization process used, the polymer 112 may further be separated from other compounds present such as carbon black. The polymer 112 produced by the devulcanization process 110 described further herein may be used as the substitute polymer 104 for the vulcanization process 106. As such, the closer the characteristics of the polymer 112 produced by the devulcanization process 110 are to the characteristics of the original polymer, the greater the amount of substitute polymer is that can be used in the vulcanization process to produce a product having acceptable characteristics.

The vulcanized rubber may be devulcanized by heating the vulcanized rubber in a solvent, which may be water. The devulcanization process is carried out at a low temperature and high pressure, in comparison to previous devulcanization processes, and produces a reaction product comprising a polymer with a molecular weight close to the starting material. The reaction product also includes carbon black, assuming the rubber being processed included carbon black, that cannot be easily separated from the higher molecular weight polymer. Although the lower temperature reaction product cannot be easily separated into polymer and carbon black, it may still be used as a substitute polymer for products requiring carbon black, or products in which carbon black is acceptable.

Figure 2:
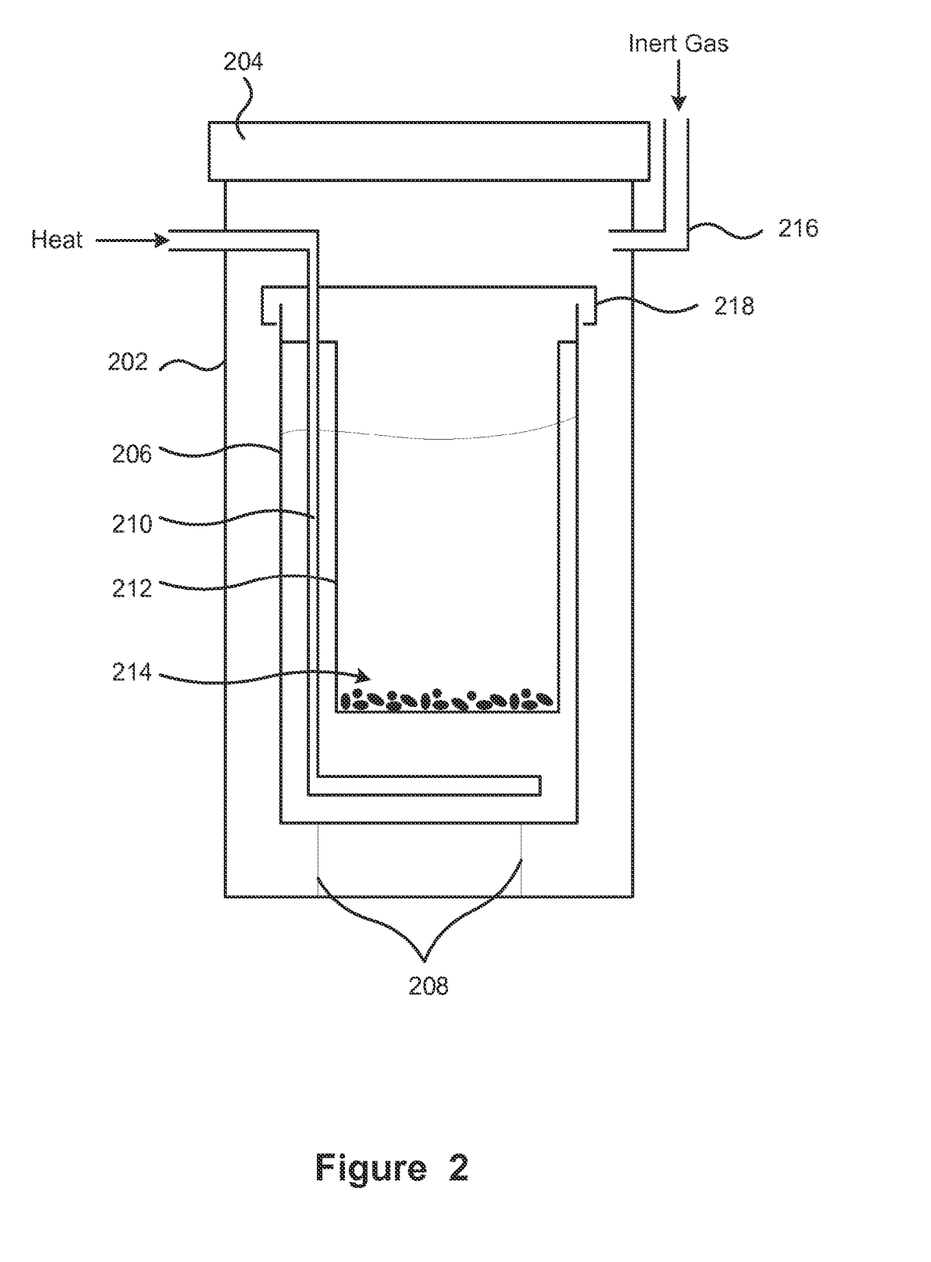
FIG. 2 depicts a schematic of a reactor for use in converting vulcanized rubber.

FIG. 2 depicts a schematic of a reactor for use in converting vulcanized rubber. The above process may be carried out in a reactor 200. The reactor 200 has an outer vessel 202 for containing the pressures, including the vapor pressure of the solvent and the over-pressure, required by the devulcanization process. The outer vessel is sealable with a lid 204. An inner vessel 206 is located within the outer vessel 202. It may be thermally isolated from the outer vessel 202 by minimizing metal to metal contact between the two vessels. Metal supports 208 may support the inner vessel on a knife-edge contact to minimize heat transfer. A heat source 210 is provided that can heat the solvent contained within the inner vessel 206. The heat source 210 may be provided in various ways such as by a vapor injector or a submersible electric heater. Regardless of the specific type of heat source used, it can heat the solvent within the inner vessel up to the required reaction temperature. The inner vessel 206 has a reaction basket 212 supported within it. The reaction basket 212 supports the rubber 214 to be devulcanized within the solvent. The reactor 200 includes an inlet 216 for inputting an inert gas, such as nitrogen, into the reactor. The inner vessel may have a lid 218; however it does not seal the inner vessel 206 from the interior of the outer vessel 202. As such, the inert gas can be partitioned between the inner and outer vessels and insulate the outer vessel 202 from the inner vessel 206. This insulation allows quicker heating and cooling of the inner vessel and so the rubber and solvent providing a quicker batch time.

During experiments with a reactor as described above with reference to FIG. 2, when sufficient nitrogen, for example 500 psi, was added at the start of the devulcanization process, it was found that the temperature in the middle of the basket of rubber was slightly higher than the water around the basket as the water was being heated. This appeared to show that there was an exothermic reaction taking place at temperatures above about 150° C. The exothermic reaction appeared to only occur in the presence of an over-pressure, provided by the nitrogen. The exothermic reaction was able to be observed because the inner vessel, which did not have a large thermal mass, had been thermally isolated from the large thermal mass of the outer vessel and was able to act in a manner similar to a Differential Thermal Analyzer (DTA).

Figure 3:
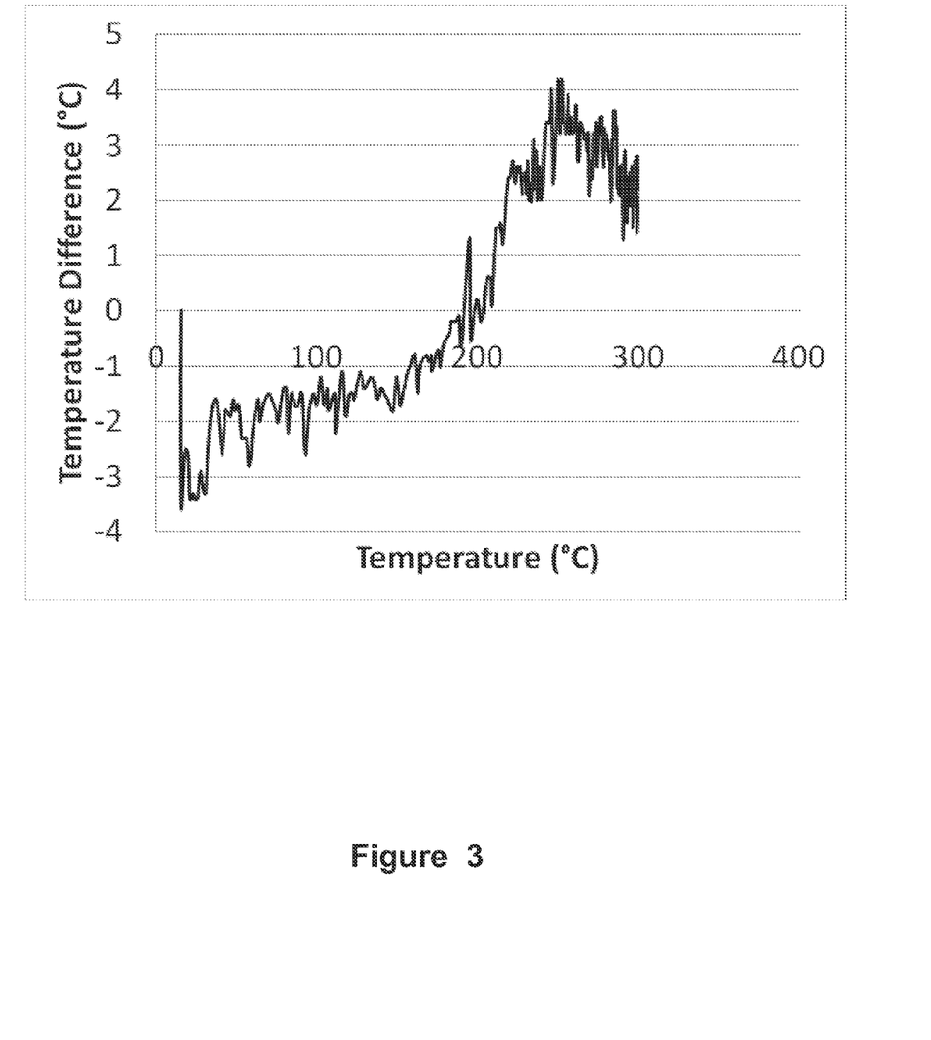
FIG. 3 is a graph depicting a temperature difference between the centre of rubber and the surrounding water as a function of temperature.

FIG. 3 is a graph depicting a temperature difference between the centre of rubber and the surrounding water as a function of temperature. The graph provides a temperature difference between the center of the rubber and the surrounding water as a function of the temperature of the water. The reaction started with 500 psi of nitrogen at room temperature. As the water was heated, the rubber became hotter, as a result of an exothermic reaction. As can be seen from the graph, the exothermic reaction began to occur at approximately 150° C.

As a result of this observation, a series of experiments were performed to see whether an added over-pressure substantially above the pressure generated by the saturated vapor itself could reduce the devulcanization temperature. The reduction in the devulcanization temperature could minimize, or at least mitigate, the reduction in the molecular weight of the resulting polymer that was observed in the devulcanization process carried out at higher temperatures. That is, carrying out the devulcanization process at a lower temperature could produce a polymer that has characteristics closer to the original polymer.

In the experiments, it was also noted that rubber from used tires that was not devulcanized at temperature below 285° C. without the added nitrogen over-pressure became malleable and lost its resilience when a similar sample was processed at the same temperature with an added nitrogen over-pressure. The vulcanized rubber appeared to have become devulcanized; however, unlike samples that were devulcanized at higher temperatures, the reaction product of the devulcanization of rubber carried out at lower temperatures did not dissolve in cyclohexane or toluene and so could not be separated into polymer and carbon black. Rheological measurements on this sample produced in the presence of the nitrogen over-pressure further showed that it had viscosities similar to un-vulcanized rubber.

The nitrogen over-pressure seemed to be devulcanizing the rubber at lower temperatures than the previous temperatures required for devulcanization without the nitrogen over-pressure. Further, the product was different in that it could not be separated into polymer and carbon black using solvents that separated the reaction products from the higher temperature reaction. It was postulated that devulcanizing the rubber at lower temperatures increased the molecular weight of the resulting polymer and this made separation using the same solvent more difficult.

Further experiments were conducted that were focused on reducing the reaction temperature even further in order to produce devulcanized rubber that had rheological properties, and in particular viscosities, similar to the original polymer used to manufacture the vulcanized rubber product, namely tires. A devulcanized rubber that has the same or similar properties as the original rubber could be added to new rubber formulations. That is, having similar viscosities to the new rubber makes it easier to blend the devulcanized rubber into the new rubber.

Rubber is a non-Newtonian fluid that has both elastic and viscous components to its viscosity. Simple measurements of its viscosity are performed with a Mooney Viscometer as described in American Society for Testing Materials (ASTM) Test D-1646: Test Methods for Rubber-Viscosity, Stress Relaxation, and Pre-Vulcanization Characteristics (Mooney Viscometer), which is hereby incorporated in its entirety by reference in its entirety. However this does not differentiate between the viscous and elastic components of the viscosity and following the devulcanization process becomes more difficult.

The viscometer described in American Society for Testing Materials (ASTM) Test D-6204: Test Methods for Rubber-Measurement of Un-vulcanized Rheological Properties Using Rotorless Shear Rheometers, and American Society for Testing Materials (ASTM) Test D-6048: Standard Practice for Stress Relaxation Testing of Raw Rubber, Unvulcanized Rubber Compounds, and Thermoplastic Elastomers, both of which are hereby incorporated by reference in their entirety, provides the capability to differentiate between the viscous and elastic components of the viscosity. The rheometer measures G' the storage shear modulus, and G" the loss shear modulus, at a defined temperature and oscillation frequency (ω) as a function of strain. The complex shear modulus G* can be calculated from G' and G" and the real dynamic viscosity (η) and the dynamic complex viscosity (η*) can be calculated by dividing G" and G* by w respectively. To compare the elastic and viscous components of the viscosity of various samples, G' and G" can be compared at a defined temperature, for example 60° C., oscillation frequency, for example 1.667 Hz, and strain, for example 40% for G' and 100% for G".

Figure 4:
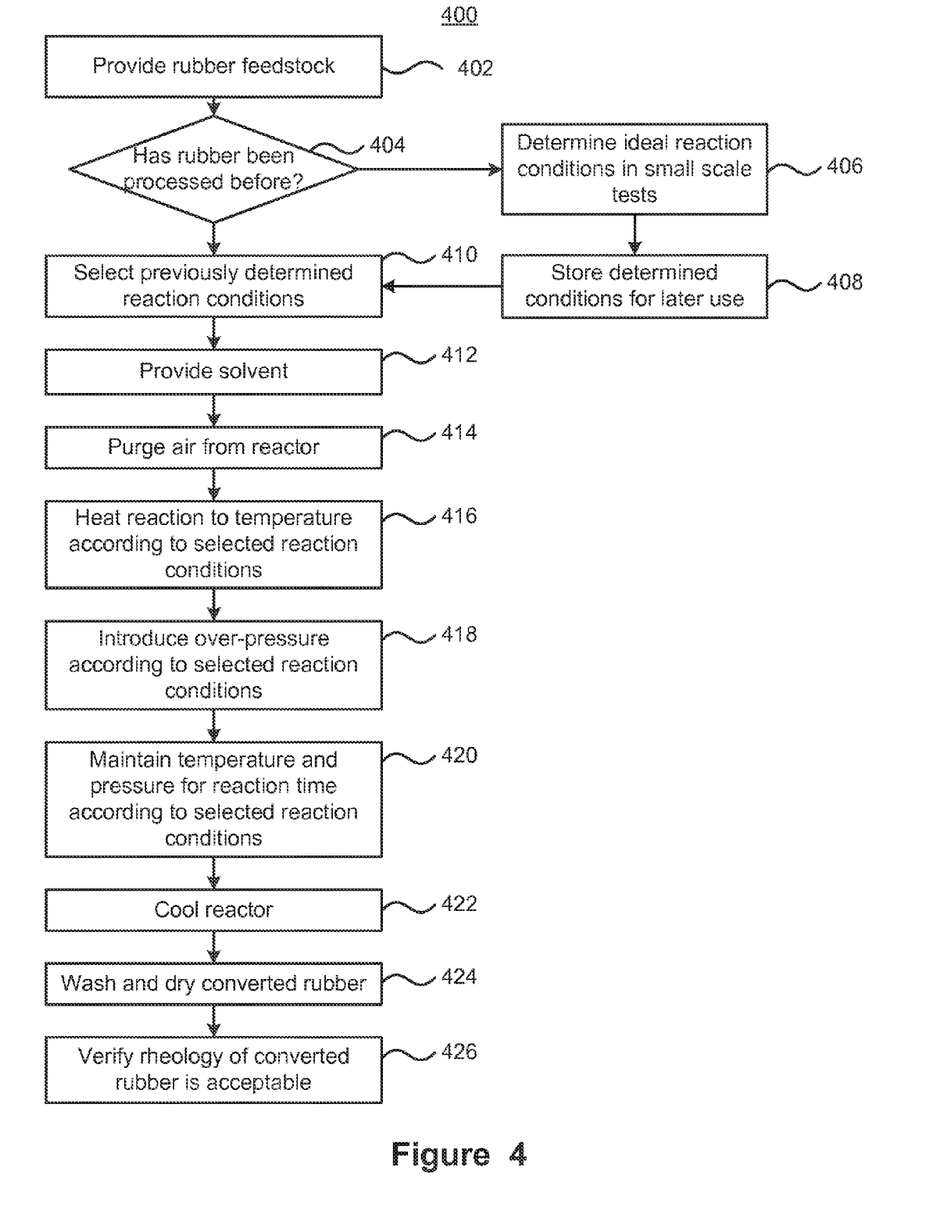
FIG. 4 depicts a process of converting vulcanized rubber.

FIG. 4 depicts a process of converting vulcanized rubber. The process begins with providing rubber feedstock (402). The rubber feedstock may be, for example, from used tires that have been shredded to produce particles of about 0.1 to 8 mm thick. Other material, such as steel and fiber belts, is also removed from the rubber feedstock. It is determined if the rubber of the feedstock, or rubber having similar properties to the feedstock, has been processed before (404). If similar rubber feedstock has not been processed before (No at 404), ideal reaction conditions are determined by performing a number of small scale tests (406) to determine an appropriate temperature, pressure and time for the reaction. The determined conditions may be stored (408) for subsequent use if the same or similar rubber feedstock is encountered again. If the rubber feedstock has been processed before (Yes at 404), the previously determined reaction conditions are selected (410). Also as depicted, if the reaction conditions have just been determined, they are selected for use in processing the remainder of the rubber feedstock.

Once the desired reaction conditions are determined, the solvent is provided (412). The solvent may be water, or a combination of water and alcohol. The solvent covers the rubber feedstock in the reactor, which may be a dual vessel reactor, although single vessel reactors may also be used. The air is purged from the reactor (414) to remove any oxygen. The air may be purged using an inert gas, that is, a gas that does not react with the reactants or products. The reaction mixture, namely the solvent and rubber feedstock, is heated to the reaction temperature of the selected reaction conditions (416) and an over-pressure introduced in accordance with the selected reaction conditions (418). Although described as being provided once the reaction mixture has been heated, the over-pressure may be provided earlier in the process. For example, the over-pressure may be provided prior to heating the reaction mixture. The reaction temperature and reaction pressure, which is a result of the vapor pressure of the solvent and the over-pressure of the inert gas, is maintained for a time in accordance with the reaction time of the selected reaction conditions (420). Once the reaction time has passed, the reactor is cooled (422). If the reactor is a dual vessel reactor as described above, the cooling of the reactor may be quicker since the outer vessel, which has a large thermal mass, does not heat up considerably. Once the reactor is cooled, the reaction product comprising the devulcanized rubber can be washed and dried (424). The rheology of the converted rubber can be tested to verify that s properties are acceptable (426).

Numerous tests were performed. The results of these tests are provided in the following examples. In all of the examples the rubber feedstock was from used automobile tires. The tires were processed to remove any steel and fiber belts contained therein. The rubber was shredded to produce chips or shavings having an irregular shape. The chips or shavings may be passed through a sieve to remove larger chunks of rubber.

Three different reactors were used in the examples. The first reactor had an internal volume of 0.5 L, was capable of operating at temperatures of up to 500° C., a maximum allowable working pressure (MAWP) of 5,000 psi, and was typically loaded with between 20 and 30 g of rubber and about 100 mL of water. The second reactor had an internal volume of 4 L, was capable of operating at temperatures of up to 400° C., a MAWP of 1500 psi and was typically loaded with 800 g of rubber and 1.2 L of water. The third reactor was an Industrial size commercial reactor that had an internal volume of 1500 L, was capable of operating at temperatures of up to 300° C., a MAWP of 1500 psi, and was loaded with up to 250 kg of rubber and 400 L of water. A pack of nitrogen gas cylinders (4,000 psi) was used to establish the nitrogen over-pressure. The reactor sized used for each of the examples is shown in the table below.

TABLE 1

Reactor size used for the different examples

| Example | Reactor Size |
| --- | --- |
| 1 | 1500 L |
| 2 | 0.5 L |
| 3 | 0.5 L |
| 4 | 4 L |
| 5 | 4 L |
| 6 | 4 L |
| 7 | 1500 L |
| 8 | 4 L |
| 9 | 4 L |
| 10 | 4 L |
| 11 | 4 L |
| 12 | 4 L |
| 13 | 4 L |
| 14 | 4 L |
| 15 | 4 L |
| 16 | 4 L |
| 17 | 4 L |
| 18 | 4 L |

The rubber feedstock was immersed in the water in the reactors. Air was purged out of the reactors with nitrogen. The temperature was raised to the desired reaction temperature with nitrogen being added to create the desired over-pressure for the different examples. The reactor was held at the desired temperature and pressure for the prescribed period of time. At the end of the prescribed reaction time the reactor was cooled to room temperature. The contents were removed, washed, and dried.

The physical properties of the processed rubber were then evaluated in two ways. The first test method was a qualitative test. If the rubber had been devulcanized and become malleable, it would form a sheet when put through a mill (i.e. through rollers). For a more detailed, and quantitative test method, the elastic (G') and viscous (G") components of the viscosity were measured on a rheometer.

In the first set of examples, the results of which are shown in table 1, rubber feedstock was processed in the reactor noted above at a predetermined temperature and time. The rubber feedstock was provided from a New Brunswick, Canada recycler and had a relatively large particle size. A ¼ inch sieve, or 3 mesh, was used to remove the fines before processing the rubber particles The chips and shavings were generally between about 1 and about 4 mm thick and had a surface area of between 0.5 to about 5 cm². The majority of chips and shavings were between 1 and 2 mm thick and had a surface area between about 1 to about 2 cm². For each example, a first sample was produced at the temperature and time without any nitrogen over-pressure, that is the rubber was only exposed to the saturated vapor pressure of the water at the set temperature. A second sample was processed to the same temperature and time but at a substantially higher pressure that was generated by adding an over-pressure of nitrogen. That is, the sample was exposed to the sum of the saturated vapor pressure of the water plus the substantial nitrogen over-pressure. For example, at 270° C. the saturated vapor pressure of water is 798 psi. In example 1 the nitrogen over-pressure was 500 psi and the total pressure in the reactor was therefore approximately 1298 psi.

TABLE 2

Effect of the Over-Pressure on the Ability of the Sample to Form a Sheet

| Example | Temp (° C.) | Time (hours) | Nitrogen Over-Pressure (psi) | Did the no over-pressure sample mix and form a sheet | Did the over-pressure sample mix and form a sheet |
|---|---|---|---|---|---|
| 1 | 285 | 1 | 500 | No | Yes |
| 2 | 270 | 1 | 3,500 | No | Yes |
| 3 | 270 | 1 | 1,500 | No | Yes |
| 4 | 270 | 1 | 500 | No | Yes |
| 5 | 270 | 3 | 500 | No | Yes |
| 6 | 250 | 6 | 725 | No | Yes |

Table 2 compares samples produced under various conditions without an over-pressure and samples produced under the same conditions but with an over-pressure.

Samples produced with and without the over-pressure were put through the rollers on a mill to see whether the samples had been devulcanized and were malleable enough to form a sheet. The results of Table 2 show that rubber from used tires was not devulcanized, that is the reaction product did not form a sheet, at temperatures of 285° C. and below unless an over-pressure was used. Table 2 also shows that rubber processed at temperatures of 285° C. and below can be devulcanized with the addition of a substantial nitrogen over-pressure. Reducing the reaction temperature, as much as possible, may reduce or minimize any reduction in the molecular weight of the resulting polymer by the process, which will provide devulcanization without any, or a reduced amount of, depolymerization.

In the second set of examples, shown in Table 3, the effect of reaction temperature, nitrogen over-pressure and reaction time was studied on the physical properties of the devulcanized product. The elastic component G' and the viscous component G" of the viscosity (which G*/ω) measured on a rheometer were compared to styrene butadiene rubber (SBR), the rubber used to manufacture car tires. A masterbatch of rubber was also used as a baseline in the comparisons. The SBR was pure polymer with no entanglement, while the masterbatch was natural rubber (NR) and carbon black that had been mixed so the polymer molecules are entangled.

TABLE 3

Rheology of Samples Produced with an Over-Pressure

| Example | Temp (° C.) | Time (hrs) | Over-Pressure (psi) | G" (psi) at 100% strain | G' (psi) at 40% strain | Comparison with SBR and masterbatch |
|---|---|---|---|---|---|---|
| SBR | n/a | n/a | n/a | 13.7 | 27.9 | Baseline |
| Masterbatch | n/a | n/a | n/a | 16 | 56 | Baseline |
| 7 | 285 | 1 | 300 | 17.3 | 48.7 | Higher G" and G'; Similar to masterbatch |
| 8 | 270 | 1 | 500 | 14.3 | 65 | Good G"; Higher G'; Slightly higher than masterbatch |
| 9 | 270 | 3 | 500 | 14.0 | 31.2 | Very Similar; Between SBR and masterbatch |
| 10 | 260 | 12 | 800 | 22.0 | 41.0 | Similar to masterbatch |
| 11 | 250 | 3 | 725 | 14.3 | 65 | Good G"; Higher G'; Slightly higher than masterbatch |
| 12 | 250 | 24 | 725 | 16.4 | 31.5 | Very Similar; Between SBR and masterbatch |
| 13 | 230 | 24 | 900 | 51.0 | 92.4 | Higher G" and G' |

Table 3 shows that rubber can be devulcanized at temperatures as low as 210° C. but that, longer times are required to completely devulcanize the rubber as the temperature is lowered. Examples 9, 10, and 12 have G" and G' close to that of SBR and are completely devulcanized. If examples 8 and 9 or 11 and 12 are compared, one can see that examples 8 or 11 have a higher G' than examples 9 or 12 showing that 1 hr for example 8 or 3 hrs for example 11 were not long enough to completely devulcanize the samples. Table 3 also shows that samples devulcanized at 230° C. will require longer processing times to complete the devulcanization process. The fact that G' and G" also drop down to values close to that of SBR indicates that minimal depolymerization is occurring during the devulcanization process. Mooney viscosities (measured at 100° C.) ranged from 25 to 80 for examples 7-13.

It should be noted that the rheology results (with the exception of example 13) are close to or below the masterbatch which means the viscosity of the devulcanized products are very similar to the masterbatch. This is advantageous when the devulcanized rubber will be mixed into new rubber compounds which will have rheological properties similar to the masterbatch. Since the devulcanized rubber will have similar properties as the new rubber compounds, a larger portion of the devulcanized rubber may be used.

Table 4 shows % devulcanization for various examples. The % devulcanization was calculated using the Flory-Rehner equation. To get the percent devulcanization, which may be don for example using test described in ASTM D6814 which is incorporated herein by reference in its entirety, the crosslink density of the devulcanized material is compared with that of the vulcanized material. The equations used require a fixed volume fraction of polymer in the sample, and as some polymer is extracted during the test a correction for the extracted polymer is required. Even with the correction, the % devulcanization is underestimated, and as such the actual % devulcanization will be higher. In addition it has been found that putting the devulcanized material through rollers, which results in flow induced molecular disentanglement of the polymer chains, increases the % devulcanization measurement even though the rollers do not result in further devulcanization.

It is also possible to plot (a Horikx Plot), based on theory, the amount of polymer that will dissolve during a swelling test against the % devulcanization for processes that involve either crosslink scission or chain scission. In a swelling test pieces of rubber are put in a solvent in which the polymer of the rubber is soluble. The rubber/polymer absorbs some of the solvent but is prevented from completely dissolving in the solvent by the crosslinks which hold the molecules together. The amount of solvent absorbed by the rubber/polymer may provide a measure of the crosslink density, that is the amount of crosslinks holding the rubber molecules together. As the crosslinks are removed the rubber will absorb more and more solvent because it is not constrained by them, until it theoretically completely dissolves in the solvent at 100% devulcanization. It is noted that while the results of a swelling test may be for rubber samples without carbon black, the results may not be as reliable for samples with carbon black. Although not as reliable, the results may still provide an indication of a % devulcanization for samples with carbon black. The ASTM swell test does not account for the fact that as the rubber approaches being fully devulcanized (for samples that contain carbon black like tires) part of the rubber will dissolve in the solvent leaving carbon black behind. This changes the composition of the remaining rubber, as it now contains a higher proportion of carbon black, and as such it will absorb less solvent. Accordingly, direct comparison between the initial sample (i.e. vulcanized rubber) with the devulcanized sample should not be relied upon as providing exact results as the proportion of polymer is in the sample is changing. However, the results may still be used as an indication of the amount of devulcanization.

For crosslink scission very little polymer will be extracted until most of, or substantially all of, the crosslinks are broken. On the other hand chain scission results in loose chains that are easily removed. So, for example, one might expect only 30-40% of the polymer to be able to be extracted at 95% devulcanization for a devulcanization process involving crosslink scission with limited chain scission, whereas 60-70% of the polymer may be able to be extracted for a process involving chain scission. As noted above, while the amount of polymer that is removed during the swelling tests and the amount of polymer that will dissolve in hot toluene are not identical they are very similar.

TABLE 4

Percent devulcanized and percent dissolving in hot toluene

| Example | Temperature (° C.) | Time (hrs) | % Devulcanized** | % of sample extracted*** | % of sample dissolving in hot toluene**** |
|---|---|---|---|---|---|
| 7 | 285 | 1 | 98 | 37 | 28 |
| 8 | 270 | 1 | 97 | 18 | 15 |
| 9 | 270 | 3 | 98 | 37 | 31 |
| 10 | 260 | 12 | 97 | 51 | 77 |
| 11 | 250 | 3 | 88 | 21 | 29 |
| 12 | 250 | 24 | 92 | 35 | 47 |
| 13 | 230 | 24 | 25 | 9 | 9 |

*sample/material size of 2-3 mesh
**Based on toluene swelling experiments
***% weight of sample extracted during the swelling test
****% dissolved when stirring in hot toluene at 70° C.

As can be seen from Table 4, while most of the devulcanized products show high levels of devulcanization they do not dissolve well in hot toluene.

Table 5 presents the % devulcanization for material from a different source. The rubber material was from a recycler in Ontario, Canada, which tend to produce a much smaller particle size, more like sand particles. These particles are typically 10-18 mesh but there are some smaller particles. Also presented is the percentage of polymer extracted during the swelling test. Table 5 shows, for example, for the sample that was processed for 1 hr at 250° C., 94% devulcanization was achieved and 24% of the material was extracted during the swelling test. Separate testing have shown that 98% of the material that was extracted during the swelling test was polymer. If one assumes that 60% of the sample was polymer, then 40% of the polymer in the sample was extracted during this swelling test.

With regard to how evenly the sample was devulcanized, at one end of the extreme (for example, if the rubber particles were being devulcanized from the outside inwards, with the centre core being devulcanized last), one could say that 94% of the sample was completely devulcanized and 6% (or the core) was not devulcanized at all. However, if 94% of the sample had been completely devulcanized then 94% of the sample would have dissolved in the hot toluene (or been extracted), which was not the case. In fact 60% of the polymer was not extracted. Accordingly, 60% of the polymer is being held together by no more than a few percent of the initial crosslinks that were in the rubber. This would imply a reasonably even devulcanization process and one resulting from crosslink scission rather than chain scission. That is the process achieves bulk devulcanization throughout the entire material as opposed to only surface devulcanization. Also, like many of the devulcanized rubbers in table 3, this sample had G' and G" numbers between SBR and the masterbatch.

TABLE 5

Effect of processing conditions on polymer that can be extracted

| Example* | Temp (° C.) | Time (hrs) | Overpressure (psi) | % Devulcanized** | % of sample extracted*** | % of sample dissolving in hot toluene**** |
|---|---|---|---|---|---|---|
| 14 | 250 | 1 | 725 | 94 | 24 | 19 |
| 15 | 250 | 2 | 725 | 95 | 27 | 23 |
| 16 | 250 | 4 | 725 | 96 | 28 | 26 |
| 17 | 240 | 4 | 815 | 72 | 21 | 20 |
| 18 | 240 | 4 | 1915 | 92 | 24 | 20 |

*10-18 mesh
**Based on toluene swelling experiments
***% weight of sample extracted during the swelling test
****% dissolved when stirring in hot toluene at 70° C.

From the above, it can be seen that the devulcanized rubbers from the described devulcanization process carried out at sub critical temperatures and pressures above the saturated vapour pressure, have viscosities similar to the masterbatch. Further, a few percent of the crosslinks are still present in the devulcanized rubber; however they prevent most of the polymer from dissolving in the toluene (i.e. preventing complete separation). Devulcanizing rubber at a lower temperature and higher pressure results in crosslink scission with minimal scission of the polymer chains.

It is noted that crosslink density measures both physical entanglements and chemical bonds or crosslinks. Rolling the devulcanized sample decreases the crosslink density which means the rolling is disentangling the polymer molecules. It may therefore be difficult to interpret the % devulcanization numbers above about 90% as part are due to physical entanglements of the polymer molecules and part due to chemical crosslinks. This means that % devulcanization above about 90% is an indication of good devulcanization, with some physical entanglements and a few % of the crosslinks remaining. Accordingly, for samples with % devulcanization above 90%, a small number of crosslinks are therefore preventing the molecules from completely dissolving in the solvent but are not enough to prevent the rubber from mixing.

The method according to the various embodiments of the invention allow for various end products. For devulcanized rubber that is completely devulcanized with minimal depolymerization the reaction products will have a carbon black to rubber polymer or hydrocarbon ratio that is approximately equal of the original rubber. Thus the reaction product can be used as an extender for rubber formulations. It will be apparent to one skilled in the art that the reaction product can be tailored for a specific application.

It will be apparent to one skilled in the art that tires can include any vulcanized rubber tire as may be used for transportation purposes. It will also be apparent that one skilled in the art that other vulcanized rubber products that include natural or synthetic rubber may be used as a feedstock. The rubber may include, for example, ethylene propylene diene monomer (EPDM); styrene-butadiene rubber (SBR); natural rubber; butyl rubber; nitrile rubber; cholinated butyl rubber; or chloroprene.

It will also be apparent to one skilled in the art that the processing conditions presented here are with respect to one embodiment of the invention. The invention encompasses those processing parameters i.e. temperature, pressure, time, that allow for subcritical temperature processing of rubber with a solvent that includes water.

The reaction temperature may be from about 150° C. to about 300° C. The reaction temperature may be more preferably from about 200° C. to about 285° C. The reaction temperature may be most preferably from about 250° C. to about 285° C.

The reaction pressure is substantially higher than the saturated vapour pressure of the solvent at the reaction temperature. The reaction pressure may be provided by over-pressure of an inert gas. The over-pressure of the inert gas is added to the saturated vapour pressure of the solvent at the reaction temperature to provide the reaction pressure that is substantially higher than the saturated vapour pressure of the solvent at the reaction temperature. The over-pressure provided by the inert gas may be between about 5 psi to about 4500 psi. The over pressure may be more preferably between about 100 psi to about 3500 psi. The over pressure may be most preferably be between about 500 psi to about 1500 psi.

The reaction time required depends upon the final product that is desired, the reaction temperature, and reaction pressure. The reaction times may be between about ½ an hour to about 24 hours. The reaction time may be between about 3 hours and about 12 hours.

The particle sizes of the vulcanized rubber may range from about 0.1 mm to 8 mm. The particle sizes of the vulcanized rubber may range from about 1 mm to 5 mm. The vulcanized rubber particles may be passed through one or more sieves or separators, which may have a mesh size of from 2-100. The mesh size may range from 3-18.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from teachings of the current description. For example, the pressure has been described as being provided by an over-pressure of an inert gas; however it may also be provided hydraulically by using hydraulic pumps to create the excess pressure by injecting additional solvent or rubber into the reactor. Therefore, the invention as defined in the claims must be accorded the broadest possible interpretation in view the teachings of the current description, and not just the specific examples.

What is claimed is:

1. A method of converting vulcanized rubber comprising:
   heating in a reactor the vulcanized rubber and a solvent to a reaction temperature below 285° C.;
   providing a reaction pressure in the reactor that is higher than a saturated vapour pressure of the solvent at the reaction temperature, the reaction pressure provided in part by an inert gas over pressure of at least 300 psi;
   maintaining the reaction temperature and the reaction pressure for a reaction time sufficient to break at least a portion of crosslinks of the vulcanized rubber, wherein bulk devulcanization of the vulcanized rubber occurs when the reaction temperature and reaction pressure are maintained for the reaction time; and
   yielding an at least partially bulk devulcanized product.

2. The method of claim 1, wherein maintaining the reaction temperature and the reaction pressure for the reaction time reduces an amount of depolymerisation that occurs.

3. The method of claim 1, wherein the vulcanized rubber is more than 90% devulcanized.

4. The method of claim 3, wherein the vulcanized rubber is substantially devulcanized after maintaining the reaction temperature and reaction pressure for the reaction time.

5. The method of claim 4, wherein substantially no depolymerisation occurs.

6. The method of claim 5, wherein said at least partially bulk devulcanized product comprises a rubber hydrocarbon having a molecular weight that is similar to a molecular weight of a rubber hydrocarbon of the vulcanized rubber prior to vulcanization.

7. The method of claim 5, wherein rheological properties of said at least partially bulk devulcanized product are similar to rheological properties of the vulcanized rubber prior to vulcanization.

8. The method of claim 7, wherein the rheological properties are measured on a rheometer and comprise an elastic component of viscosity (G') and a viscous component of viscosity (G").

9. The method of claim 1, wherein the solvent is a mixture of water and an organic solvent.

10. The method of claim 9, wherein the organic solvent comprises alcohol.

11. The method of claim 9, wherein the organic solvent consists of alcohol.

12. The method of claim 1, wherein the solvent comprises water.

13. The method of claim 12, wherein the reaction temperature is between about 150° C. and about 285° C.

14. The method of claim 12, wherein the reaction temperature is between about 200° C. and about 285° C.

15. The method of claim 12, wherein the reaction pressure is between 300 psi and 4500 psi higher than the saturated pressure of the solvent.

16. The method of claim 15, wherein the reaction pressure is between 500 psi and 1500 psi higher than the saturated vapour pressure of the solvent.

17. The method of claim 1, wherein the inert gas comprises nitrogen.

18. The method of claim 1, wherein the pressure is provided in part hydraulically.

19. The method of claim 1, wherein the vulcanized rubber is from used tires.

20. The method of claim 19, wherein the used tires are shredded to produce pieces of vulcanized rubber having a particle size between about 0.1 mm and about 5 mm.

21. The method of claim 1, further comprising:
   mixing said at least partially bulk devulcanized product with virgin polymer; and
   vulcanizing the mixture of said product and virgin polymer.

22. The method of claim 1, further comprising purging air from the reactor prior to heating.

23. The method of claim 1, further comprising washing and drying said at least partially bulk devulcanized product.

24. The method of claim 1, wherein the vulcanized rubber comprises:
   ethylene propylene diene monomer (EPDM);
   styrene-butadiene rubber (SBR);
   natural rubber;
   butyl rubber;
   nitrile rubber;
   cholinated butyl rubber; or
   chloroprene.

* * * * *